US006240468B1

(12) United States Patent
Capelli

(10) Patent No.: US 6,240,468 B1
(45) Date of Patent: May 29, 2001

(54) INTERPOSED GRAPHICS DEVICE DRIVER MODULE PROCESSING FUNCTION REQUESTS WITHIN MODULE IN STANDARD MODE, AND PASSING FUNCTION REQUESTS TO SPECIALIZED MODE DEVICE DRIVER IN SPECIALIZED MODE

(75) Inventor: Ronald Bruce Capelli, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,485

(22) Filed: Dec. 18, 1998

(51) Int. Cl.[7] .......................... G06F 13/00; G06F 13/10; G06F 15/00; G06F 15/76; G06F 9/44

(52) U.S. Cl. .................................. 710/14; 710/8; 710/15; 710/62; 710/104; 712/43; 712/229

(58) Field of Search ................................ 710/2, 5, 8, 14, 710/15, 16, 31, 38, 62, 63, 64, 72, 104; 712/43, 229; 345/22, 23, 24

(56) References Cited

U.S. PATENT DOCUMENTS

| | | | | |
|---|---|---|---|---|
| 5,257,097 | | 10/1993 | Pineau et al. | 358/500 |
| 5,404,445 | * | 4/1995 | Matsumoto | 395/162 |
| 5,418,962 | * | 5/1995 | Bodin et al. | 395/700 |
| 5,477,242 | * | 12/1995 | Thompson et al. | 345/132 |
| 5,502,808 | * | 3/1996 | Goddard et al. | 395/162 |
| 5,590,312 | * | 12/1996 | Marisetty | 395/500 |
| 5,678,059 | * | 10/1997 | Ramaswamy et al. | 395/821 |
| 5,687,376 | | 11/1997 | Celi, Jr. et al. | 395/704 |
| 5,752,032 | * | 5/1998 | Keller et al. | 395/681 |
| 5,784,037 | * | 7/1998 | Inoue | 345/87 |
| 6,112,260 | * | 8/2000 | Colterjohn et al. | 710/31 |
| 6,130,721 | * | 10/2000 | Yoo et al. | 348/558 |
| B1 6,175,861 | * | 1/2001 | Williams, Jr. et al. | 709/217 |

OTHER PUBLICATIONS

N.S. Bowen, J. Antognini, R.D. Regan and N.C. Matsakis, Availability in Parallel Systems: Automatic Process Restart, IBM Systems Journal, vol. 36, No. 2, pp. 284–300.

* cited by examiner

*Primary Examiner*—Thomas Lee
*Assistant Examiner*—Tanh Nguyen
(74) *Attorney, Agent, or Firm*—Jeffrey S. LaBaw; Bracewell & Patterson, L.L.P.

(57) ABSTRACT

A module is interposed between the operating system and/or applications of a data processing system and the device driver for a graphics adapter within the data processing system. The interposed module may selectively intercept all graphics device driver function requests or simply pass such requests to a device driver supporting specialized (e.g., non-VGA) graphics modes. Standard (e.g., VGA) graphics mode(s) device driver support is accessible to the interposed module. When a specialized graphics mode is selected, the interposed is inactive and passes graphics function requests to the specialized device driver. When a standard graphics mode is selected, the interposed module is active and intercepts all graphics function requests, processing such request with available standard graphics mode support. Change of the graphics mode from standard to specialized or vice versa results in the interposed module changing from active to inactive or vice versa. Requests to set the graphics mode are similarly passed to the specialized device driver or processed by the interposed module depending on whether a standard or specialized graphics mode is requests. Initialization and termination function requests are both passed to the specialized device driver and processed by the interposed module. The interposed module is preferably implemented in accordance with the GRADD architecture model, with the interposed module implemented as a variant of a GRADD filter.

20 Claims, 3 Drawing Sheets

INTERPOSED GRAPHICS DEVICE DRIVER MODULE PROCESSING FUNCTION REQUESTS WITHIN MODULE IN STANDARD MODE, AND PASSING FUNCTION REQUESTS TO SPECIALIZED MODE DEVICE DRIVER IN SPECIALIZED MODE

BACKGROUND OF THE INVENTION

1. Technical Field

The present invention relates in general to graphics display in data processing systems and in particular to graphics display in multiple graphics modes in a data processing system. Still more particularly, the present invention relates to supporting multiple graphics modes within a data processing system without reinstalling graphics device drivers for each mode or utilizing specialized device drivers supporting multiple modes.

2. Description of the Related Art

Support for standard Video Graphics Array (VGA) modes is provided at the register level in most contemporary graphics adapters for data processing systems. Although the definition of Super VGA (SVGA) modes—defined in terms of resolution, color-depth, and video timings—has been somewhat standardized, there is no standard register-level compatibility for SVGA video modes.

Nearly all currently-available personal computer graphics adapters provide standard VGA graphics modes, in addition to other SVGA graphics modes which are specific to the adapter. A graphics device driver for a specific graphics adapter invariably supports only the device-dependent SVGA modes provided by the adapter. A separate VGA driver needs to be installed to support the standard VGA graphics modes. Thus, while an SVGA graphics device driver usually allows the user to switch between different SVGA modes without installing difference devices drivers, the user cannot select a VGA graphics mode without explicitly installing a different device driver. The most common technique for switching between standard (e.g., VGA) and specialized (e.g., SVGA) graphics modes in a data processing system is to replace (i.e. reinstall) the graphics device driver. Another alternative is to include support for both standard and specialized modes in the same device driver.

As new graphics device standards develop on the personal computer and other workstation platforms, similar situations may be expected to arise. It would be desirable, therefore, to provide support for multiple standard and specialized graphics modes in a data processing system without replacing device drivers or employing specialized device drivers.

SUMMARY OF THE INVENTION

It is therefore one object of the present invention to provide an improved method and apparatus for graphics display in data processing systems.

It is another object of the present invention to provide an improved method and apparatus for graphics display in multiple graphics modes in a data processing system.

It is yet another object of the present invention to provide a method and apparatus for supporting multiple graphics modes within a data processing system without reinstalling graphics device drivers for each mode or utilizing specialized device drivers supporting multiple modes.

The foregoing objects are achieved as is now described. A module is interposed between the operating system and/or applications of a data processing system and the device driver for a graphics adapter within the data processing system. The interposed module may selectively intercept all graphics device driver function requests or simply pass such requests to a device driver supporting specialized (e.g., non-VGA) graphics modes. Standard (e.g., VGA) graphics mode(s) device driver support is accessible to the interposed module. When a specialized graphics mode is selected, the interposed is inactive and passes graphics function requests to the specialized device driver. When a standard graphics mode is selected, the interposed module is active and intercepts all graphics function requests, processing such request with available standard graphics mode support. Change of the graphics mode from standard to specialized or vice versa results in the interposed module changing from active to inactive or vice versa. Requests to set the graphics mode are similarly passed to the specialized device driver or processed by the interposed module depending on whether a standard or specialized graphics mode is requests. Initialization and termination function requests are both passed to the specialized device driver and processed by the interposed module. The interposed module is preferably implemented in accordance with the GRADD architecture model, with the interposed module implemented as a variant of a GRADD filter.

The above as well as additional objects, features, and advantages of the present invention will become apparent in the following detailed written description. dr

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
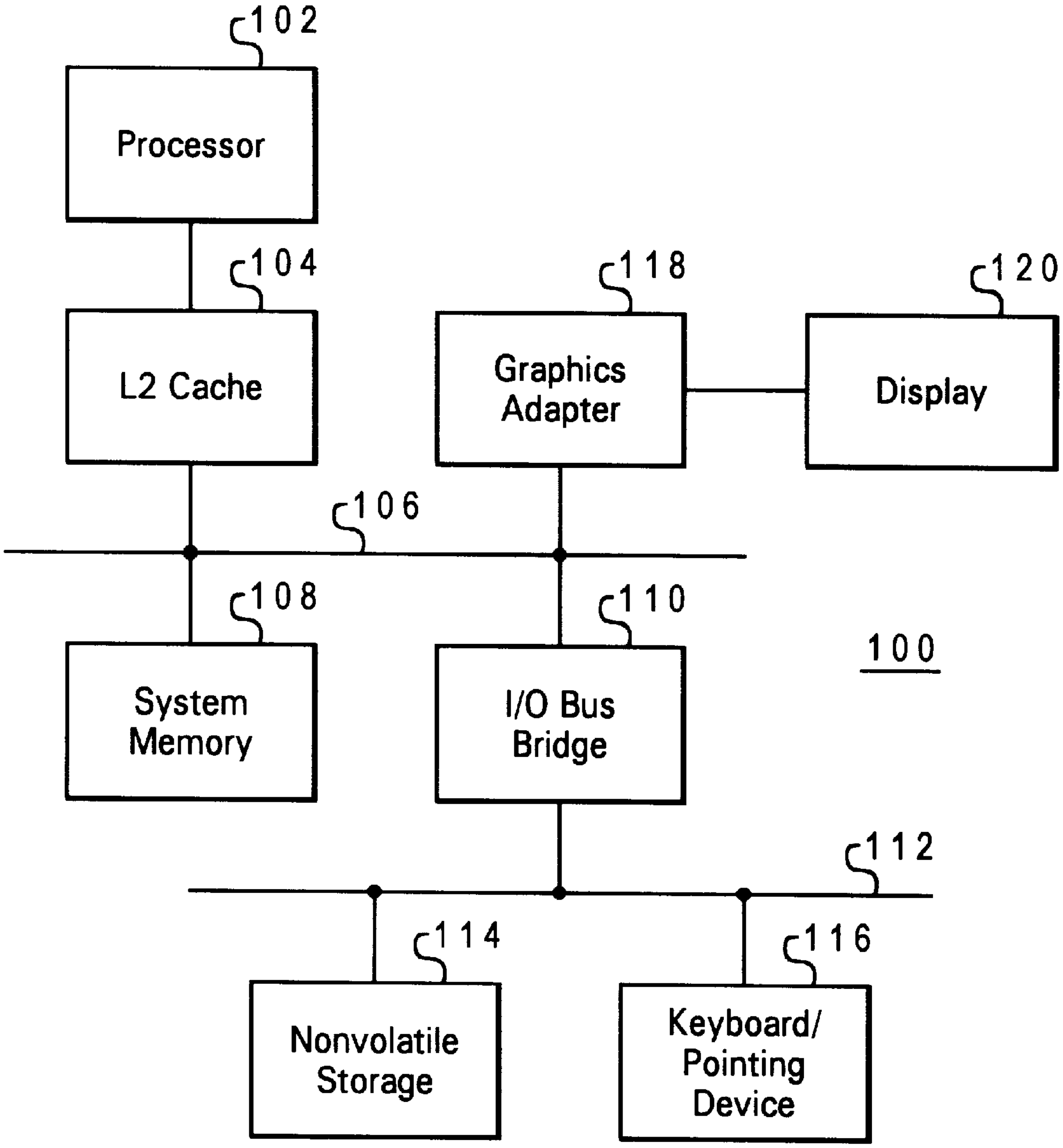
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be one of the models of personal computers available from International Business Machines Corporation of Armonk, N.Y. Data processing system 100 includes processor 102, which in the exemplary embodiment is connected to a level two (L2) cache 104, which is connected in turn to a system bus 106.

Also connected to system bus 106 is system memory 108 and input/output (I/O) bus bridge 110. I/O bus bridge 110 couples I/O bus 112 to system bus 106, relaying and transforming data transactions from one bus to the other. Peripheral devices such as nonvolatile storage 114, which may be a hard disk drive, and keyboard/pointing device 116, which may include a conventional mouse, a trackball, or a digitizer pad, are connected to I/O bus 112.

In a preferred embodiment, data processing system 100 includes graphics adapter 118 connected to system bus 106, receiving primitives for rendering from processor 102 and generating pixels for display 120 as described in further detail below. Data processing system 100 preferably includes an operating system and device driver (not shown) supporting both standard and specialized video modes as described below.

The exemplary embodiment shown in FIG. 1 is provided solely for the purposes of explaining the invention and those skilled in the art will recognize that numerous variations are possible, both in form and function. For instance, data processing system 100 may include a CD-ROM and/or DVD drive, or a look-up table and/or digital-to-analog converter may be implemented between graphics adapter 118 and display 120. All such variations are believed to be within the spirit and scope of the present invention.

Figure 2:
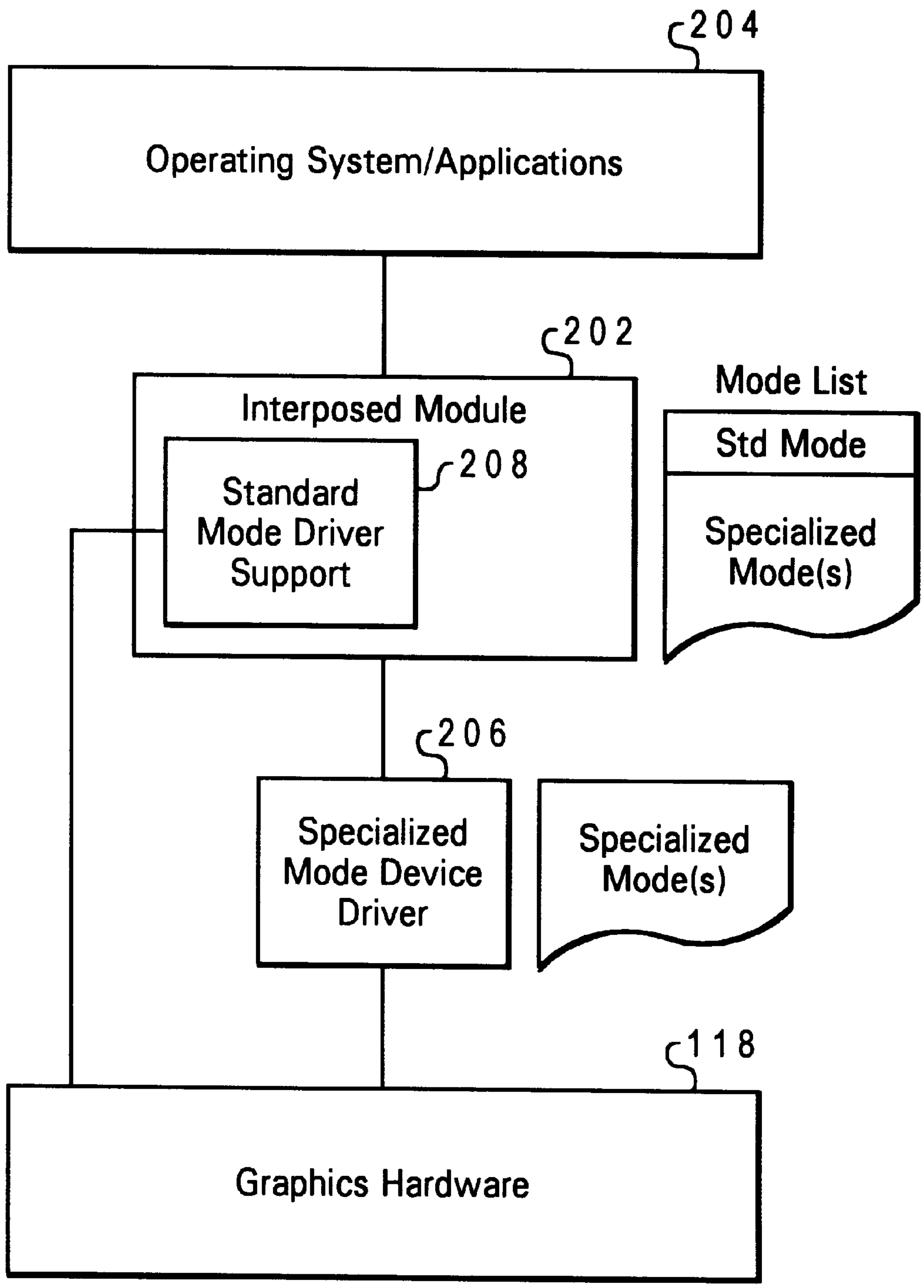
FIG. 2 a block diagram of a graphics display subsystem supporting multiple standard and specialized graphics modes in accordance with a preferred embodiment of the present invention.

With reference now to FIG. 2, a block diagram of a graphics display subsystem supporting multiple standard and/or specialized graphics modes in accordance with a preferred embodiment of the present invention is illustrated. In the present invention, a module 202 is interposed between the operating system and applications 204 and a device driver(s) 206 supporting specialized (SVGA, other non-VGA) graphics modes for the graphics adapter 118. Although depicted as a single device driver, specialized device driver(s) 206 may actually comprise a serial chain of device drivers for the specialized graphics mode being supported. The interposed module 202 may selectively intercept all graphics device driver function requests, may selectively simply pass graphics device driver function requests to specialized device driver(s) 206, and provides support 208 for standard (VGA) device graphics modes.

The interposed module 202 monitors graphics device driver function requests and chooses whether or not to pass such requests on to specialized device driver(s) 206 based on the graphics mode to which the data processing system is currently set. When a standard graphics mode is selected, the interposed module 202 sets the selected standard mode without invoking specialized device driver(s) 206 and sets its own internal state to active. When a specialized graphics mode is selected, interposed module 202 sets its own internal state to inactive and invokes specialized device driver(s) 206 to set the specified specialized mode.

While the internal state of interposed module 202 is active, interposed module 202 intercepts all graphics device driver function requests and processes the intercepted requests itself, without invoking specialized device driver(s) 206. While inactive, the interposed module 202 invokes the specialized device driver(s) 206 to process the request. Setting the graphics mode of a data processing system thus effectively sets the internal state of interposed module 202.

Independent of the internal state, interposed module 202 should pass initialization/termination function requests to specialized device driver(s) 206, as well as perform its own initialization/termination responsive to such function requests. Upon receiving a function request for a list of available and supported graphics modes, interposed module 202 may invoke any device driver within specialized device driver(s) 206 supporting the specialized graphics modes to obtain a list of the specialized graphics modes supported by specialized device driver(s) 206. Interposed module 202 appends the standard graphics modes which it supports to the specialized graphics modes list prior to returning the list to a caller.

The interposed module 202 is preferably implemented in accordance with the Graphics Adapter Device Driver (GRADD) architecture model disclosed and described in U.S. Pat. No. 5,715,459 entitled Advanced Graphics Driver Architecture, which is incorporated herein by reference. Interposed module 202 is preferably although not necessarily a GRADD filter functioning as a standalone VGA graphics device driver and modified to switch between standard and specialized graphics modes as described above.

Figure 3:
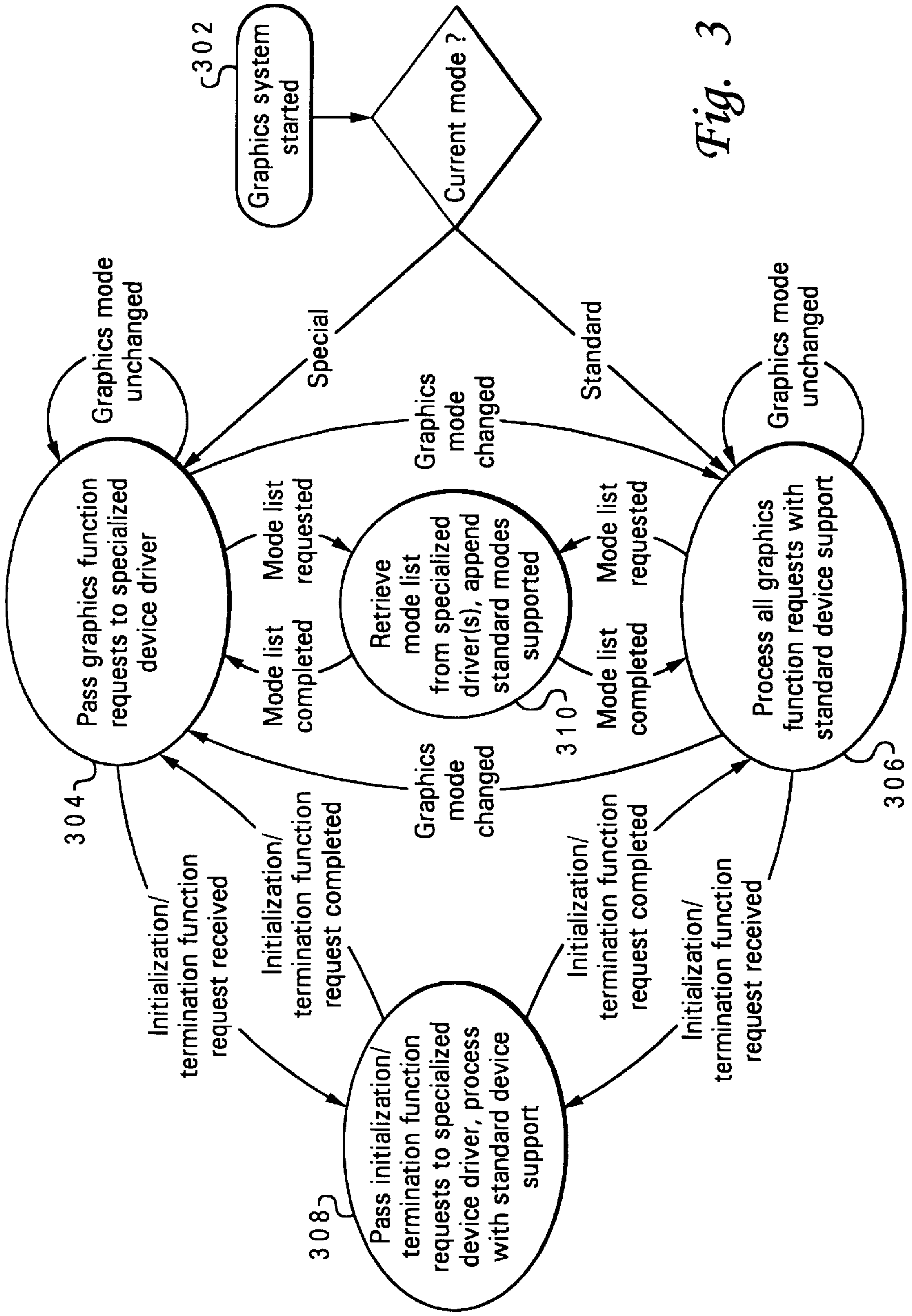
FIG. 3 depicts a high level flowchart for a process of supporting multiple standard and specialized graphics modes in accordance with a preferred embodiment of the present invention.

With reference now to FIG. 3, a high level state diagram for a process of supporting multiple standard and specialized graphics modes in accordance with a preferred embodiment of the present invention is depicted. The process is implemented by the data processing system and graphics display subsystem described above.

The process begins at state 302, which depicts the graphics system being started. The process next transitions to either state 304 or state 306, depending on the current graphics mode. If the current graphics mode is a specialized mode—SVGA or other non-VGA—the process transitions to state 304, which illustrates an interposed module at the interface of a specialized device driver passing graphics function requests to the specialized device driver. In this state, the interposed module is in the inactive state as described above. As long as the graphics mode remains unchanged, the process remains in state 304. If a request to set the mode is received, and the selected mode is a specialized mode, the process remains in state 304 and the set mode request is passed to the specialized device driver.

If the current graphics mode is a standard graphics mode at startup, the process transitions from state 302 to state 306, which depicts the process handling graphics function requests at the interposed module with standard graphics mode device support available to the interposed module. In this state, the interposed module is in the active state described above. As long as the graphics mode remains unchanged, or is changed to another standard graphics mode, the process remains in state 306. If a request to set the mode is received with the selected graphics mode being a standard mode, the process remains in state 306 and the set mode request is processed by the interposed module.

In either of states 304 and 306, if the graphics mode is changed to the other class (standard vs. specialized) of graphics modes, the process transitions between states 304 and 306. The interposed module similarly transitions from an active to inactive internal state, or vice versa. Receipt of a set mode request for a graphics mode within the other class of graphics modes will prompt a transition state from 304 to 306 or vice versa, depending on the current state.

From either of states 304 or 306, if an initialization or termination function request is received, the process transitions to state 308, which illustrates passing the initialization or termination function requests to the specialized device driver and processing that request with the standard graphics mode support available to the interposed module. Upon completion of the initialization or termination request, the process transitions from state 308 back to the state from which it originated when the initialization or termination request was received.

From either of states 304 or 306, if a mode list is requested by an application or the operating system, the process transitions to state 310, which depicts retrieving the mode list of graphics modes supported by the specialized driver(s). This mode list is returned to the interposed module rather than to the application or operating system component requesting the mode list. The interposed module then appends the list of standard modes supported by the interposed module to the list of specialized modes supported by the specialized device driver(s), and returns the complete mode list to the requesting application or operating system component. This occurs transparently to the specialized device drivers. Upon of the mode list to the requesting application or operating system component, the process transitions from state 310 back to the state from which it originated when the mode list request was received.

While the exemplary embodiment has been described in the context of VGA modes as "standard" graphics modes and non-VGA modes as "specialized" graphics modes, other standard versus nonstandard classes of graphics modes may exist within other environments, such as in workstation environments. The present invention is thus not limited to VGA and non-VGA device drivers. The distinction drawn herein is between standardized graphics modes as opposed to those which have not been standardized and require device drivers adapted specifically to the nonstandard graphics mode.

The present invention allows multiple graphics modes, both standard VGA modes and specialized, non-VGA modes, to be supported in a data processing system without reloading the device driver when changing between standard and specialized graphics modes and without custom device drivers supporting both standard and specialized graphics modes. The ability to employ ordinary device drivers results in a more economic production cost.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of supporting standard and specialized graphics modes in a data processing system, comprising:

interposing a module between an operating system for the data processing system and a device driver for a graphics adapter within the data processing system, wherein the device driver does not support any standard graphics modes;

during operation of the data processing system, monitoring function requests to the device driver and determining a current graphics mode utilizing the interposed module;

responsive to determining that the current graphics mode is a specialized mode, passing the function requests to the device driver for the graphics adapter through the interposed module for processing by the device driver; and responsive to determining that the current graphics mode is a standard mode, intercepting the function requests at the interposed module and processing the function requests with available standard device driver support within the interposed module.

2. The method of claim 1, wherein the step of determining a current graphics mode utilizing the interposed module further comprises:

checking an internal state of the interposed module.

3. The method of claim 1, wherein the step of passing the function requests to the device driver for the graphics adapter through the interposed module further comprises:

passing all function requests to the device driver for the graphics adapter while the current graphics mode is any specialized mode.

4. The method of claim 1, wherein the step of intercepting the function requests at the interposed module and processing the function requests with available standard device driver support within the interposed module further comprises:

intercepting all function requests while the current graphics mode is any standard mode and processing the intercepted function requests with the available standard device driver support within the interposed module.

5. The method of claim 1, further comprising:

employing the interposed module to detect changes to the current graphics mode.

6. The method of claim 1, further comprising:

changing an internal state within the interposed module when the current graphics mode is changed from any standard graphics mode to any specialized graphics mode or from any specialized graphics mode to any standard graphics mode.

7. The method of claim 1, further comprising:

responsive to receiving a request for a graphics mode list:

retrieving a specialized mode list of graphics modes supported by the device driver from the device driver at the interposed module;

appending a standard mode list of graphics modes supported by the interposed module with the available standard device driver support to the specialized mode list to form a complete mode list; and returning the complete mode list from the interposed module.

8. A system for supporting standard and specialized graphics modes in a data processing system, comprising:

a device driver for a graphics adapter, wherein the device driver does not support any standard graphics modes;

a source of function requests for the device driver; and a module interposed between the device driver and the source, the interposed module:

determining a current graphics mode;

responsive to determining that the current graphics mode is a specialized mode, passing the function requests to the device driver for the graphics adapter through the interposed module for processing by the device driver; and responsive to determining that the current graphics mode is a standard mode, intercepting the function requests at the interposed module and processing the function requests with available standard device driver support within the interposed module.

9. The system of claim 8, wherein the interposed module checks an internal state to determine the current graphics mode.

10. The system of claim 8, wherein the interposed module is set to a first internal state when the current graphics mode is set to any standard graphics mode.

11. The system of claim 10, wherein the interposed module is set to a second internal state when the current graphics mode is set to any specialized graphics mode.

12. The system of claim 8, wherein the interposed module passes all function requests to the specialized device driver when the current graphics mode is any specialized graphics mode.

13. The system of claim 8, wherein the interposed module intercepts all function requests when the current graphics mode is any standard graphics mode.

14. The system of claim 8, wherein the interposed module, in response to receiving a request for a mode list:

retrieves a specialized mode list of graphics modes supported by the device driver from the device driver;

appends a standard mode list of standard graphics modes supported at the interposed module with the available standard device driver support to the specialized mode list to form a complete mode list; and returns the complete mode list in response to the mode list request.

15. A computer program product within a computer usable medium for supporting standard and specialized graphics modes in a data processing system, comprising:

instructions for interposing a module between an operating system for the data processing system and a device driver for a graphics adapter within the data processing system, wherein the device driver does not support any standard graphics modes;

instructions, executed during operation of the data processing system, for monitoring function requests to the device driver and for determining a current graphics mode utilizing the interposed module;

instructions, responsive to determining that the current graphics mode is a specialized mode, passing the function requests to the device driver for the graphics adapter through the interposed module for processing by the device driver; and instructions, responsive to determining that the current graphics mode is a standard mode, intercepting the function requests at the interposed module and processing the function requests with available standard device driver support within the interposed module.

16. The computer program product of claim 15, wherein the instructions for determining a current graphics mode utilizing the interposed module further comprise:

instructions for checking an internal state of the interposed module.

17. The computer program product of claim 15, wherein the instructions for passing the function requests to the device driver for the graphics adapter through the interposed module for processing by the device driver further comprise:

instructions for passing all function requests to the device driver for the graphics adapter while the current graphics mode is any specialized mode.

18. The computer program product of claim 15, wherein the instructions for intercepting the function requests at the interposed module and processing the function requests with available standard device driver support within the interposed module further comprise:

instructions for intercepting all function requests while the current graphics mode is any standard mode.

19. The computer program product of claim 15, further comprising:

instructions for detecting changes to the current graphics mode utilizing the interposed module.

20. The computer program product of claim 15, further comprising:

instructions for changing an internal state within the interposed module when the current graphics mode is changed from any standard graphics mode to any specialized graphics mode or from any specialized graphics mode to any standard graphics mode.

* * * * *